Patented Mar. 1, 1927.

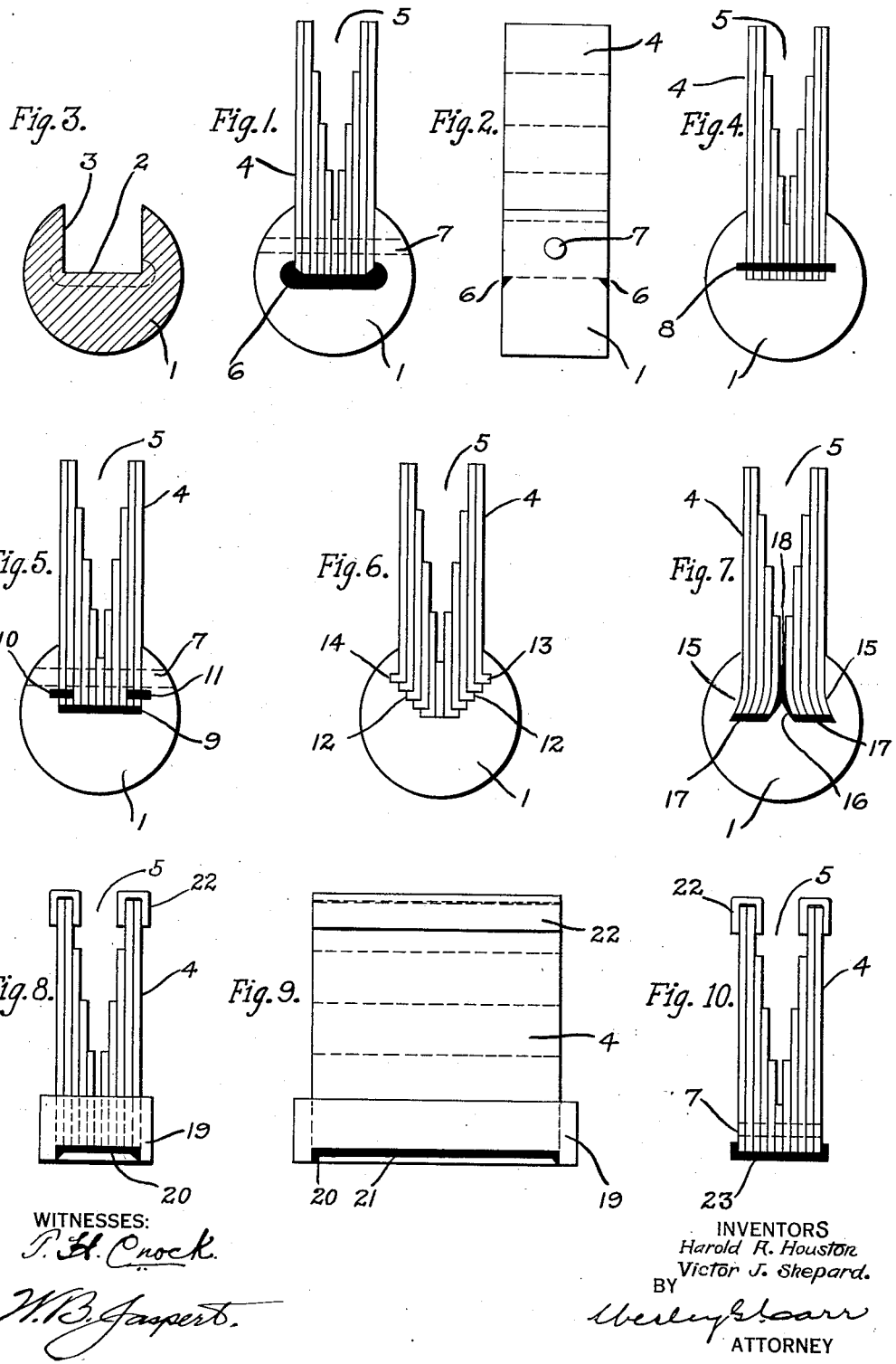

1,619,346

UNITED STATES PATENT OFFICE.

HAROLD A. HOUSTON, OF WILKINSBURG, AND VICTOR J. SHEPARD, OF PITTSBURGH, PENNSYLVANIA, ASSIGNORS TO WESTINGHOUSE ELECTRIC AND MANUFACTURING COMPANY, A CORPORATION OF PENNSYLVANIA.

WELDED SPRING STRUCTURE.

Application filed March 1, 1922. Serial No. 540,367.

Our invention relates to resilient bodies, more especially to spring structures, such as are employed in flexible driving mechanisms of electric locomotives.

It is among the objects of this invention to provide a spring member of simple construction which shall be inexpensive to manufacture, of uniform quality, mechanically strong and durable and adapted to heavy duty use.

It is a further object of this invention to provide a spring-nest structure comprising a plurality of spring elements which shall be secured together at one end to form a unitary structure.

It has been customary to form resilient members by superposing a plurality of leaf springs of different lengths and securing them midway between their ends by suitable bolts, rivets or brackets to form a unitary structure which is employed to provide a resilient support between a vehicle body and its bed frame.

According to our present invention, we propose to employ spring-nests of somewhat similar construction that are adapted to be employed as spokes between a hub member of a drive shaft and the working rim of a gear wheel as described in the copending application of H. A. Houston, Serial No. 574,311, filed July 11, 1922, which has matured into Patent No. 1,451,576 issued April 10, 1923, assigned to the Westinghouse Electric & Manufacturing Company. As described in this application, the springs are constructed to receive a cantilever load and may be modified in design to obtain any degree of flexing desired.

In the accompanying drawings constituting a part hereof and in which like reference characters designate like parts, Figure 1 is a front elevational view of a spring-nest formed in accordance with our invention;

Fig. 2 is a side elevational view thereof;

Fig. 3 is a cross-sectional view of a base member embodied in the structure of Figs. 1 and 2;

Figs. 4, 5, 6 and 7 are front elevational views of modified forms of spring-nest structures made in accordance with this invention;

Fig. 8 is a front elevational view of a modified form of spring comprising a plurality of assembled leaves having a band formed around one end thereof;

Fig. 9 is a side elevational view thereof; and

Fig. 10 is a front elevational view of a spring-nest comprising a plurality of spring leaves welded at one end to provide a unitary structure.

Referring particularly to Figs. 1 and 2, our preferred form of spring-nest structure comprises a substantially cylindrical base member 1 having a relatively wide slot 2 with parallel sides 3 formed therein, in which a plurality of spring leaves 4 of varying length are grouped in such manner as to provide a gap 5 therebetween. The assembled leaves 4 are inserted in the slot 2 of the base member 1 and secured therein by welding along the edges 6 at the base of the leaves 4 and slot 2. It may be desirable to further reinforce the structure by an anchor rod such as a dowel pin or screw 7 extending through the base member 1 and the leaves 4.

Another method of securing the spring leaves 4 to the base 1 is shown in Fig. 4. It consists in welding the leaves along their edges on both sides and partially across the face of the base 1. To insure a good weld, it is advisable to cut a groove 8 in the springs to obtain better adhesion of the welded metal, which is deposited therein, to the structure.

Still another method of securing the spring leaves 4 to the base is shown in Fig. 5, where the leaves are welded along the groove 9 across the bottom edges of the blades and the grooves 10 and 11, which are formed across certain of the leaves and partially across the base member. Either of these structures, Figs. 4 and 5, may be strengthened by an anchor rod or dowel pin 7, as in the structure shown in Fig. 2.

In Fig. 6 is shown a structure in which the spring leaves are retained by reason of their interlocking relation. This arrangement consists of a base member 1 having a substantially V-shape slot radially therein, the sides of which are provided with off-set portions 12 and grooves 13 and 14, which are adapted to receive a plurality of superposed L-shape spring leaves, having their turned-up ends abutting to form an interlocked structure.

As shown in Fig. 7, we may employ another type of combined mechanical and welded structure which consists of a base member 1 having a dovetail slot 15 provided with a central wedge portion 16 which may be inserted into or comprise an integral part of the base. The spring leaves 4 are assembled in the base by forcing them into the slot so that their ends become distorted by the wedge 16 to fit the dovetail. The leaves are then secured by a weld 18 along the top of the wedge 16 between the central leaves and along the bottom edge 17.

In Figs. 8 and 9 is shown another modification of our invention in which a spring-nest structure consisting of a plurality of spring leaves 4 is provided with a band 19 secured to the ends of the leaves by weld deposits 20 and 21. The free ends of the outer leaves 4 are provided with bands 22 to provide a more rigid support and to protect the engaging ends against wear when assembled between the hub and rim of a gear wheel.

In Fig. 10 is shown a simplified form of spring-nest comprising a plurality of spring leaves 4 welded along their base 23 and reinforced by an anchor rod 7. This structure is adapted for use without a base and it may be inserted in slots of suitable dimensions in the hubs of flexible gear wheels.

Spring-nest made in accordance with the above description are adapted to be fitted into correspondingly shaped slots or openings near the outer periphery of a central hub support of a gear wheel and the projecting ends are fitted into correspondingly shaped slots of the gear rim which is disposed around the outer periphery of the hub. It will be readily seen that the advantages of this type of spring construction are that they may be readily assembled and removed from the gear structure without disturbing any of its parts and that the method of forming the spring-nests is simple and inexpensive and is readily controllable to insure uniform quality of the spring with respect to size, stress, and the like.

Although we have described a specific embodiment of our invention it will be obvious to those skilled in the art that various modifications may be made in the details of construction thereof. For instance, the bases of the spring-nest may be either of cylindrical or rectangular shape or entirely omitted. The strength of the springs may be varied by varying the thickness and length of the leaves employed and the method of securing the spring in the base may be accomplished in various ways, as indicated by the modifications shown. These and other changes may be made in the details of construction without departing from the spirit of our invention.

We claim as our invention:

1. A spring-nest comprising a cylindrical base member and a plurality of spring leaves united therewith by anchor rods.

2. A spring-nest comprising a base member and a plurality of spring leaves united therewith by anchor rods and welding.

3. A spring-nest comprising a base member and a plurality of spring leaves, said leaves having one of their extended ends secured integrally with said base.

4. A spring-nest comprising a base member and a plurality of spring leaves, said leaves having one of their extended ends secured integrally with said base member by welding.

5. A spring-nest comprising a cylindrical base member and a plurality of spring leaves, said leaves having one end secured in said base member by welding to form a unitary structure.

6. A spring-nest comprising a base member and a plurality of superposed spring leaves, said leaves having one of their extended ends welded to said base member to form an integral structure.

7. A spring-nest comprising a substantially cylindrical base member having a slot therein and a plurality of flat spring leaves fitted in said slot and secured to said base member by welding to produce an integral structure.

8. A spring-nest comprising a substantially cylindrical base member having a slot therein and a plurality of flat spring leaves fitted in said slot and secured thereto by welding.

9. A spring-nest comprising a substantially cylindrical base member having a relatively wide slot therein, and a plurality of spring leaves of different lengths disposed in said slot and secured to said base.

10. A spring-nest comprising a substantially cylindrical base member having a relatively wide slot therein, and a plurality of spring leaves of different lengths, disposed in said slot and secured to said base member by welding.

11. A spring-nest comprising a substantially cylindrical base member having a relatively wide slot therein, and a plurality of spring leaves of different lengths disposed in said slot and, secured to said base member by welding along the edges of said slot.

12. A spring-nest comprising a substantially cylindrical base member having a relatively wide slot therein, a plurality of spring leaves of different lengths, said leaves being secured to said base member by welding along the edges of said slot and said leaves.

13. A spring-nest comprising a substantially cylindrical base member having a relatively wide slot therein, a plurality of spring leaves of different lengths disposed in said slot and, secured to said base member by welding along the edges of said slot and said leaves, and a steel band around certain of said leaves.

14. A spring-nest comprising a substantially cylindrical base member having a relatively wide slot therein, a plurality of spring leaves of different lengths disposed in said slot and, secured to said base member by welding along the edges of said slot and said leaves, and a steel band around the ends of certain of said leaves.

In testimony whereof, we have hereunto subscribed our names this 25th day of February, 1922.

HAROLD A. HOUSTON.
VICTOR J. SHEPARD.

CERTIFICATE OF CORRECTION.

Patent No. 1,619,346.   Granted March 1, 1927, to

HAROLD A. HOUSTON ET AL.

It is hereby certified that error appears in the printed specification of the above numbered patent requiring correction as follows: Page 2, line 126, claim 12, after the word "therein", insert the word "and"; same claim, lines 127 and 128, strike out the words "said leaves being" and insert instead "disposed in said slot and"; and that the said Letters Patent should be read with these corrections therein that the same may conform to the record of the case in the Patent Office.

Signed and sealed this 29th day of March, A. D. 1927.

Seal.

M. J. Moore,
Acting Commissioner of Patents.